3,017,410
17β,18-BISOXYGENATED ANDROST-4-EN-3-ONES
AND INTERMEDIATE
Raphael Pappo, Skokie, Ill., assignor to G. D. Searle & Co., Chicago, Ill., a corporation of Delaware
No Drawing. Filed Dec. 28, 1959, Ser. No. 862,044
6 Claims. (Cl. 260—239.55)

The present invention relates to novel 18-oxygenated steroids of the androstane series and, more particularly, to 17β,18-bisoxygenated androst-4-en-3-ones of the structural formula

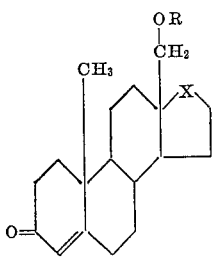

wherein X is selected from the group consisting of carbonyl, β-hydroxymethylene, and β-(lower alkanoyl)oxymethylene radicals; and R is selected from the group consisting of hydrogen and lower alkanoyl radicals.

Also included within the scope of this invention is a novel compound, 18,20-epoxypregn-4-en-3-one 20-hydroperoxide, useful as an intermediate in the manufacture of the 17β,18-bisoxygenated substances designated supra.

Starting materials suitable for the preparation of the instant compounds are 18,20-epoxy-20-hydroxypregn-4-en-3-one and 18,20-epoxypregna-4,20-dien-3-one. Treatment of either of the latter substances with hydrogen peroxide in a suitable solvent medium results in the aforementioned 18,20-epoxypregn-4-en-3-one 20-hydroperoxide. Treatment of this hydroperoxide with methanesulfonyl chloride produces 18-acetoxy-17-chloroandrost-4-en-3-one and 17β,18-dihydroxyandrost-4-en-3-one ketene acetal of the structural formula

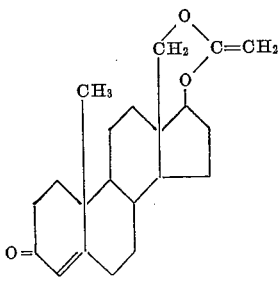

Alternatively, the acetal can be produced by reaction of the aforementioned hydroperoxide with methanesulfonic anhydride. This acetal, upon treatment with water, affords 18-acetoxy-17β-hydroxyandrost-4-en-3-one. Hydrolysis of this monoacetate, typically with aqueous sodium hydroxide in methanol, results in the instant 17β,18-dihydroxyandrost-4-en-3-one.

Acylation of the aforementioned 17β,18-dihydroxyandrost-4-en-3-one with an excess quantity of a lower alkanoic acid anhydride in pyridine produces the 17β,18-di-(lower alkanoates) of this invention, whereas reaction with a limited quantity of the acylating agent results in the 18-mono-(lower alkanoates). As a specific illustration, the utilization of acetic anhydride results in 17β,18-diacetoxypregn-4-en-3-one and 18-acetoxy-17β-hydroxypregn-4-en-3-one.

The instant 17β-mono-(lower alkanoates) are obtained by preferential hydrolysis of the 18-(lower alkanoyl)oxy group of the aforementioned 17β,18-di-(lower alkanoates), suitably with one equivalent of sodium hydroxide in methanol. For instance, 17β,18-diacetoxyandrost-4-en-3-one is treated with one equivalent of sodium hydroxide in methanol to afford 17β-acetoxy-18-hydroxyandrost-4-en-3-one.

Oxidation of the aforementioned 17β-hydroxy-18-mono-(lower alkanoates), typically with chromic acid in acetone, yields the 18-(lower alkanoyl)oxy-17-ones of the present invention. As a specific example, 18-acetoxy-17β-hydroxyandrost-4-en-3-one in acetone is treated with an aqueous chromic acid solution to afford 18-acetoxyandrost-4-ene-3,17-dione. Hydrolysis of these 18-(lower alkanoyl)oxy-17-ones, suitably in an acidic medium, results in the instant 18-hydroxy-17-ones. Treatment of the aforementioned 18-acetoxy-17β-hydroxy-4-en-3-one, for example, with p-toluenesulfonic acid in aqueous methanol produces 17β,18-dihydroxyandrost-4-en-3-one.

The compounds of this invention are useful as a result of their valuable pharmacological properties. They are, for example, anti-hormonal agents in consequence of their ability to inhibit the sodium-retaining activity of desoxycorticosterone acetate.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

Method A.—A solution of 12.4 parts of 18,20-epoxy-20-hydroxypregn-4-en-3-one in 270 parts of warm benzene is cooled and diluted with 360 parts of ether. The mixture is cooled to about 5°, then treated successively with 15 parts of 90% aqueous hydrogen peroxide and 0.28 part of p-toluenesulfonic acid monohydrate. Stirring is continued for about one hour at 5°. The resulting precipitate is collected by filtration, washed with ether, and dried to afford 18,20-epoxypregn-4-en-3-one 20-hydroperoxide, M.P. 185–190° (dec.). It displays infrared maxima at 3.0, 6.0, and 11.5 microns.

Method B.—The substitution of an equivalent quantity of 18,20-epoxypregna-4,20-dien-3-one for 18,20-epoxy-20-hydroxypregn-4-en-3-one in the process described under Method A results also in 18,20-epoxypregn-4-en-3-one 20-hydroperoxide.

Method C.—To a solution of 50.56 parts of 18,20-epoxy-20-hydroxypregn-4-en-3-one in 567 parts of warm dioxane is added 0.98 part of p-toluenesulfonic acid monohydrate. The resulting mixture is cooled to room temperature, then treated with 111.2 parts of 30% aqueous hydrogen peroxide over a period of about 2 minutes. Stirring is continued for about one hour at 0–5°; and the resulting precipitate is collected by filtration, washed successively with dioxane and ether, and dried to afford 18,20-epoxypregn-4-en-3-one 20-hydroperoxide, identical with the product obtained by the procedure of Method A supra.

*Example 2*

To a solution of 14.8 parts of methanesulfonyl chloride in 55 parts of anhydrous pyridine, cooled to 0–5°, is added 5.53 parts of 18,20-epoxypregn-4-en-3-one 20-hydroperoxide. The reaction mixture is stirred until homogeneity is achieved, allowed to stand at 5° for about 4 hours, then treated successively with ice and ether. The resulting mixture is extracted with an ether-benzene solution and the organic extract is washed successively with hydrochloric acid, water, aqueous sodium hydroxide, and water; dried over anhydrous sodium sulfate, and evaporated to dryness at reduced pressure. The residue is dissolved in benzene and adsorbed on silica gel.

The chromatographic column is eluted with 20% ether in benzene to afford 18-acetoxy-17-chloroandrost-4-en-3-one, which exhibits maxima in the infrared at 3.4, 5.75, 6.0, 7.23, 8.0, and 9.65 microns.

Further elution of the column with 2% ethanol in ether yields 18-acetoxy-17β-hydroxyandrost-4-en-3-one, M.P. 170–175°. This substance possesses maxima in its infrared absorpton spectrum at 2.92, 3.39, 3.42, 5.75, 6.0, 8.0, 9.5, 9.57, and 11.5 microns.

*Example 3*

A solution of 30 parts of methanesulfonic anhydride in 132 parts of benzene is added to 200 parts of pyridine with stirring, and the mixture is cooled to 0–5°. To this mixture is added a solution of 6.5 parts of 18,20-epoxy-pregn-4-en-3-one 20-hydroperoxide in 200 parts of pyridine, and stirring is continued at 5° for about 5 hours. Ice is added and the mixture is stirred for about one hour longer, then extracted with an etherbenzene solution. This extract is washed successively with hydrochloric acid, water, aqueous sodium hydroxide, and water; dried over anhydrous sodium sulfate, and evaporated to dryness at reduced pressure. A benzene solution of the residue is adsorbed on silica gel. The column is eluted with 10% ether in benzene, then with 1% ethanol in ether. Concentration of the ethanolether eluate affords 18-acetoxy-17β-hydroxyandrost-4-en-3-one, identical with the substance described in Example 2.

*Example 4*

To a solution of 4.8 parts of 18-acetoxy-17β-hydroxyandrost-4-en-3-one in 158 parts of methanol is added 15 parts of 30% aqueous sodium hydroxide, and the resulting mixture is heated at reflux, under nitrogen, for about 15 minutes, then allowed to stand at room temperature for about 4 hours. The mixture is extracted with benzene and the extract washed with water, dried over anhydrous sodium sulfate, and evaporated to dryness in vacuo. The gummy residue is crystallized from benzene to afford 17β,18-dihydroxyandrost-4-en-3-one, M.P. 152–154°.

*Example 5*

A mixture of 3 parts of 17β,18-dihydroxyandrost-4-en-3-one, one part of acetic anhydride, and 30 parts of pyridine is allowed to stand at room temperature for about 16 hours. This reaction mixture is diluted with water and extracted with benzene, and the extract washed successively with dilute hydrochloric acid and water, dried over anhydrous sodium sulfate, and concentrated to dryness in vacuo. The residue is adsorbed on silica gel and eluted with 2% ethanol in ether to afford 18-acetoxy-17β-hydroxyandrost-4-en-3-one, identical with the product described in Example 2.

The substitution of an equivalent quantity of propionic anhydride in the herein-described process results in 17β-hydroxy-18-propionoxyandrost-4-en-3-one.

*Example 6*

A solution of 9.4 parts of 18-acetoxy-17β-hydroxyandrost-4-en-3-one in 240 parts of acetone is treated gradually with an aqueous solution, 8 N in chromium trioxide and 8 N in sulfuric acid, until the presence of excess reagent is indicated by the persistence of an orange color for about 3 minutes. The mixture is allowed to stand at room temperature for about 5 minutes longer, then treated with isopropyl alcohol to destroy the excess chromium trioxide and evaporated to dryness in vacuo. The residue is extracted with benzene and the extract washed with water, dried over anhydrous sodium sulfate, and evaporated to dryness at reduced pressure. Crystallization of the residue from ether-benzene results in 18-acetoxyandrost-4-ene-3,17-dione, M.P. 128–129°. This diketone exhibits infrared maxima at 3.4, 3.5, 5.72, 5.98, 6.2, 7.25, 8.05, 8.16, 8.25, 9.7, and 11.57 microns.

The substitution of an equivalent quantity of 17β-hydroxy-18-propionoxyandrost-4-en-3-one in the instant process results in 18-propionoxyandrost-4-ene-3,17-dione.

*Example 7*

A mixture of 4.79 parts of 18-acetoxyandrost-4-ene-3,17-dione, 5 parts of p-toluenesulfonic acid monohydrate, 400 parts of methanol, and 20 parts of water is allowed to stand at room temperature for about 4 days, then evaporated to dryness in vacuo. The residue is extracted with benzene, and the extract washed successively with aqueous potassium bicarbonate and water, dried over anhydrous sodium sulfate, and concentrated to dryness under reduced pressure to yield 18-hydroxyandrost-4-ene-3,17-dione, which displays infrared maxima at 2.85, 3,39, 3.42, 5.8, 6.0, 6.18, and 11.5 microns.

*Example 8*

A mixture of one part of 17β,18-dihydroxyandrost-4-en-3-one, 10 parts of acetic anhydride, and 10 parts of pyridine is allowed to stand at room temperature for about 16 hours, then diluted with water and extracted with benzene. The organic extract is washed successively with dilute hydrochloric acid and water, dried over anhydrous sodium sulfate, and evaporated to dryness at reduced pressure to produce 17β,18-diacetoxyandrost-4-en-3-one. It exhibits maxima in the infrared at 3.39, 3.42, 5.75, 5.8, 6.0, 6.18, 8.1, and 11.5 microns.

By substituting an equivalent quantity of butyric anhydride for the acetic anhydride and otherwise proceeding according to the herein described processes, 17β,18-dibutyroxyandrost-4-en-3-one is obtained.

*Example 9*

To a solution of 10 parts of 17β,18-diacetoxyandrost-4-en-3-one in 800 parts of methanol is added a solution of one part of sodium hydroxide in 800 parts of methanol. The mixture is allowed to stand at room temperature for about 16 hours. It is then extracted with benzene and the organic extract washed with water, dried over anhydrous sodium sulfate, and concentrated to dryness in vacuo. The residue is adsorbed on silica gel and eluted with ether to afford 17β-acetoxy-18-hydroxyandrost-4-en-3-one. This monoacetate displays maxima in the infrared at 2.9, 3.39, 3.42, 5.8, 6.0, 6.18, 8.0, 9.5, and 11.5 microns.

The substitution of an equivalent quantity of 17β,18-dibutyroxyandrost-4-en-3-one in the process of this example results in 17β-butyroxy-18-hydroxyandrost-4-en-3-one.

What is claimed is:
1. A compound of the structural formula

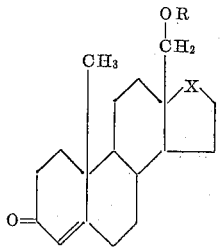

wherein X is selected from the group consisting of carbonyl, β-hydroxymethylene, and β-(lower alkanoyl)oxymethylene radicals; and R is selected from the group consisting of hydrogen and lower alkanoyl radicals.
2. 17β,18-dihydroxyandrost-4-en-3-one.
3. 18-acetoxy-17β-hydroxyandrost-4-en-3-one.
4. 18-acetoxyandrost-4-ene-3,17-dione.
5. 18-hydroxyandrost-4-ene-3,17-dione.
6. 18,20-epoxypregn-4-en-3-one 20-hydroperoxide.

No references cited.